(12) United States Patent
Heesemans et al.

(10) Patent No.: US 8,760,408 B2
(45) Date of Patent: Jun. 24, 2014

(54) TOUCH SCREEN WITH PRESSURE-DEPENDENT VISUAL FEEDBACK

(75) Inventors: Michael Heesemans, Eindhoven (NL); Galileo June Destura, Eindhoven (NL); Ramon Eugene Franciscus Van De Ven, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 1589 days.

(21) Appl. No.: 11/572,925

(22) PCT Filed: Jul. 21, 2005

(86) PCT No.: PCT/IB2005/052449
§ 371 (c)(1),
(2), (4) Date: Jan. 30, 2007

(87) PCT Pub. No.: WO2006/013518
PCT Pub. Date: Feb. 9, 2006

(65) Prior Publication Data
US 2008/0204427 A1  Aug. 28, 2008

(30) Foreign Application Priority Data

Aug. 2, 2004  (EP) .................................... 04103707

(51) Int. Cl.
*G06F 3/041* (2006.01)
*G06F 3/045* (2006.01)
*G06F 3/033* (2013.01)

(52) U.S. Cl.
USPC .......... 345/173; 345/179; 345/174; 178/19.04

(58) Field of Classification Search
USPC .......... 345/156, 173, 174, 179; 715/762–764, 715/772, 773, 859–862, 864; 341/22, 34; 463/37; 178/19.04
See application file for complete search history.

(56) References Cited

U.S. PATENT DOCUMENTS

| | | | |
|---|---|---|---|
| 5,708,460 A | 1/1998 | Young et al. | |
| 6,414,674 B1 | 7/2002 | Kamper et al. | |
| 6,636,203 B1 | 10/2003 | Wong et al. | |
| 6,801,211 B2* | 10/2004 | Forsline et al. | ............... 345/581 |
| 6,940,494 B2* | 9/2005 | Hoshino et al. | ............... 345/173 |
| 7,345,675 B1* | 3/2008 | Minakuchi et al. | ........... 345/173 |
| 7,760,187 B2* | 7/2010 | Kennedy | ....................... 345/173 |
| 2001/0050691 A1 | 12/2001 | Komato | |

(Continued)

FOREIGN PATENT DOCUMENTS

| | | |
|---|---|---|
| EP | 0595746 A | 5/1994 |
| JP | 11212726 A | 8/1999 |

(Continued)

OTHER PUBLICATIONS

Kenneth P. Fishkin et al; "Embodied User Interfaces for Really Direct Manipulation", Communications of the ACM, Sep. 2000, vol. 43, No. 9.

*Primary Examiner* — Kevin M Nguyen

(57) ABSTRACT

A data processing system, e.g., a remote control device, has a pressure-sensitive touch screen arranged over a display monitor. The monitor provides a visual indication depending on a magnitude of a pressure registered by the touch screen. The indication is rendered as centered on the touch area and has an attribute that depends on the pressure exerted.

15 Claims, 1 Drawing Sheet

(56) References Cited

U.S. PATENT DOCUMENTS

| | | |
|---|---|---|
| 2002/0163498 A1 | 11/2002 | Chang et al. |
| 2003/0067440 A1 | 4/2003 | Rank |
| 2003/0067450 A1 | 4/2003 | Thursfield et al. |
| 2003/0117408 A1 | 6/2003 | Forsline et al. |
| 2003/0151589 A1 * | 8/2003 | Bensen et al. ............... 345/156 |
| 2004/0021643 A1 | 2/2004 | Hoshino et al. |

FOREIGN PATENT DOCUMENTS

| | | |
|---|---|---|
| JP | 2001350586 A | 12/2001 |
| JP | 2003272463 A | 9/2003 |
| WO | 9638833 A1 | 5/1996 |

* cited by examiner

TOUCH SCREEN WITH PRESSURE-DEPENDENT VISUAL FEEDBACK

FIELD OF THE INVENTION

The invention relates to a data processing system with a pressure sensitive touch screen for enabling user-interaction with the system.

BACKGROUND ART

Such a system is known from, e.g., EP-A 0 595 746 on "METHOD AND SYSTEM FOR INPUT DEVICE PRESSURE INDICATION IN A DATA PROCESSING SYSTEM. The known system provides a pressure-dependent visual feedback to the user, enabling the user to adjust the pressure exerted on the touch screen under control of the visual indication. The system provides a visual indication of pressures exerted by user at pressure sensitive graphical input device, such as a touch screen or mouse, which is coupled to a data processing system. A video display device is utilized to provide a pointer or graphic representation of an input to the pressure sensitive graphical input device at a location within the display indicative of that input. Upon selection of the pressure sensitive graphical input device the pressure exerted by the user is periodically determined and utilized to vary the appearance of the graphic representation of that input, permitting variations in the pressure exerted at a pressure sensitive graphical input device to be visually indicated. By automatically varying the color or size of an associated pointer, or by varying a numeric or graphic condition associated with a pointer, in response to an amount of pressure exerted by a user at a pressure sensitive graphical input device that pressure may be easily and continuously determined.

SUMMARY OF THE INVENTION

The inventors have realized that the pressure-dependent visual feedback given in the known system has a serious drawback, namely, that the visual feedback is to be given at a location on the touch screen that is remote from another location on the screen at which the pressure is exerted. If the locations were the same, the user's hand or finger, or the stylus manipulated by the user, would obscure the visual feedback. However, this configuration of different screen locations renders the interaction less user-friendly as the user has to keep an eye on both locations in operational use of the system. In addition, using one location for touching and another for the corresponding pressure-dependent visual feedback is not very efficient regarding screen real estate, especially not on handheld devices such as PDAs, cell phones and MP3 players.

The inventors therefore propose an alternative approach. Accordingly, the invention relates to a data processing system with a pressure-sensitive touch screen arranged over a display monitor. The monitor provides a visual indication depending on a magnitude of a pressure registered by the touch screen. The indication is rendered as centered around a first area on the monitor below a second area on the screen at which the pressure is exerted. In this manner, the user is actually looking at the touch location to get visual feedback regarding the pressure exerted. Preferably, the first area has a first dimension that is under control of a second dimension of the second area. This feature ensures that the size of the visual indication is made dependent on the size of the contact area, i.e., the area that the user is touching. The advantage is that the visual indication is always visible regardless of the size of the finger of the current user or of the stylus being used to interact with the touch screen. Preferably, the indication has a graphical representation with an attribute that depends on a magnitude of the pressure, e.g., a size, a color, or contrast with an image rendered on the display in the area being touched, etc. In an embodiment of the invention, the visual indication can be made to remain visible for some time after the pressure has been removed.

The system of the invention can be a distributed system, wherein the monitor and touch screen combination is connected to a computer or server via a data network such as the Internet. Alternatively, the system of the invention is accommodated in a single apparatus, e.g., a desktop or laptop PC, a palmtop PC, a cell phone, a remote control device or another handheld device.

The invention also relates to control software for implementing the functionality described above in a data processing system with a pressure-sensitive touch screen arranged over a display monitor. The software can be commercially exploited, e.g., as an after-market add-on or upgrade for data processing systems that have the display monitor/touch screen configuration as discussed.

The invention also relates to a pressure-sensitive touch screen arranged over a display monitor, wherein the monitor is configured to provide a visual indication depending on a magnitude of a pressure registered by the touch screen and wherein the indication is rendered as centered around a first area on the monitor below a second area on the screen at which the pressure is exerted. This display monitor/touch screen combination can be commercially exploited as a user interface for a data processing system.

The invention also relates to a method of facilitating user interaction with a data processing system having a pressure-sensitive touch screen arranged over a display monitor. The method of the invention comprises providing a visual indication on the monitor depending on a magnitude of a pressure registered by the touch screen, wherein the indication is rendered as centered around a first area on the monitor below a second area on the screen at which the pressure is exerted. In an embodiment of the invention, the method comprises controlling a first dimension of the first area in dependence of a second dimension of the second area. In a further embodiment of the method, the indication comprises a graphical representation with an attribute that depends on a magnitude of the pressure. The attribute comprises, e.g., the size or shape, the color, the contrast with the image rendered on the display, the transparency, etc. Preferably, the attribute has a property that is user-programmable. Such a method is method is relevant to, e.g., a service provider who provides a service via a data network such as the Internet. The service provider provides a GUI and receives data representative of a touch location and a touch pressure, and interprets this data as commands to, e.g., control the location and visual aspects of a cursor in a menu of user-selectable options displayed in, for example, a web page, a geographic map, etc.

BRIEF DESCRIPTION OF THE DRAWING

The invention is explained in further detail, by way of example and with reference to the accompanying drawing wherein.

Throughout the figures, same reference numerals indicate similar or corresponding features.

Detailed Embodiments

Figure 1:
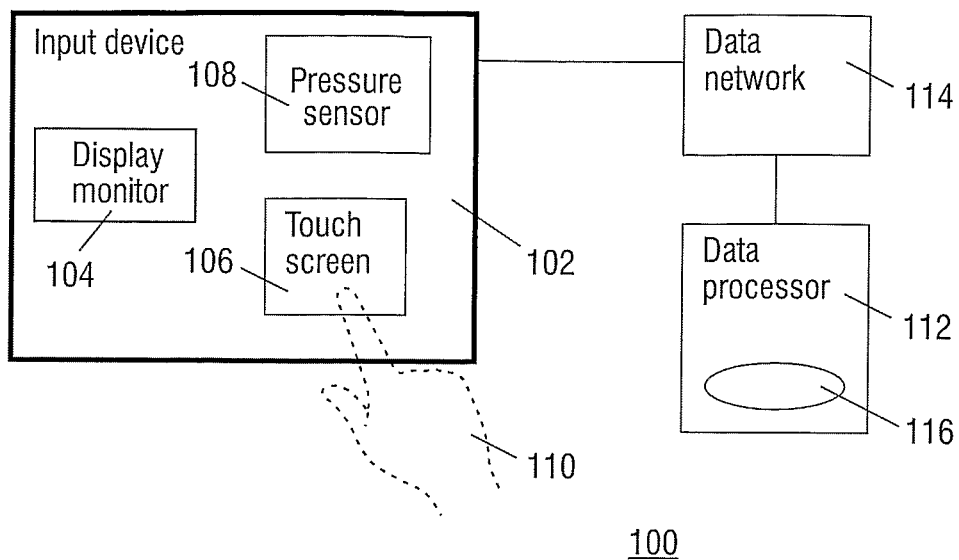
FIG. 1 is a block diagram of a system in the invention.

FIG. 1 is a block diagram of a system 100 in the invention. System 100 30 comprises a user input device 102 that itself has a display monitor 104, a pressure-sensitive touch screen 106 and a pressure sensor 108. A pressure-sensitive touch screen is capable of processing input data input data representative of a force or pressure that the user exerts on the touch screen in operational use, and preferably also of data representative of the touch location relative to the screen. Touch screen 106 is positioned over display monitor 104, but are drawn here as separated in order to not obscure the drawing. Sensor 108 detects the magnitude of the pressure applied by user 110 to screen 106. System 100 further comprises a data processor 112 that is connected to device 102, e.g., via a data network 114 as in the drawing. In another embodiment device 102 and processor 112 are directly connected, e.g., wirelessly or via a cable, or are integrated with one another within a single physical apparatus such as a cell phone or remote control device. Processor 112 in this example comprises control software 116 to have system 100 operate according to the invention.

Figure 2:
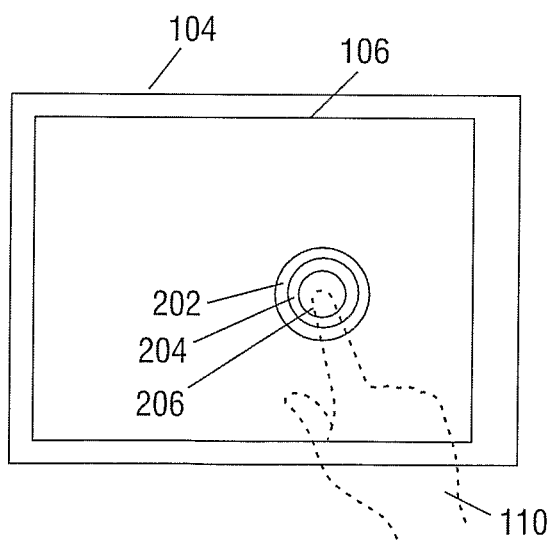
FIGS. 2 and 3 illustrate the pressure-dependent visual indication.

FIG. 2 illustrates the operation of a first embodiment of the invention. In FIG. 2, touch screen 106 registers a contact with user 110 at a specific location with a specific surface area determined by the dimensions of the contacting object, here the user's finger 110. System 100 now provides a visual indication 202 rendered on monitor 104. Indication 202 has an attribute, here: dimension, that depends on the magnitude of the pressure registered by sensor 108. Indication 202 may be shaped as, e.g., a disc opaque or semi-transparent. When the user increases the pressure, the dimension of the indication is increased accordingly, giving rise to indication 204. When the user increases the pressure further, the indication is enlarged as well and results in indication 206. When the user decreases the pressure again, the indication may take on the appearance of indication 204. Alternatively, the indication corresponding to the highest pressure may remain visible for some time after the pressure has decreased or has even disappeared. This is a matter of suitable software 116. The dimension of the indication may appear to smoothly follow the magnitude of the pressure. Alternatively, the indication may change in discrete steps upon reaching a value of the pressure considered a threshold between two adjacent ranges of numerical values of the pressure. The latter option is useful if the pressure is being used to select from among multiple options in a menu, for example.

Figure 3:
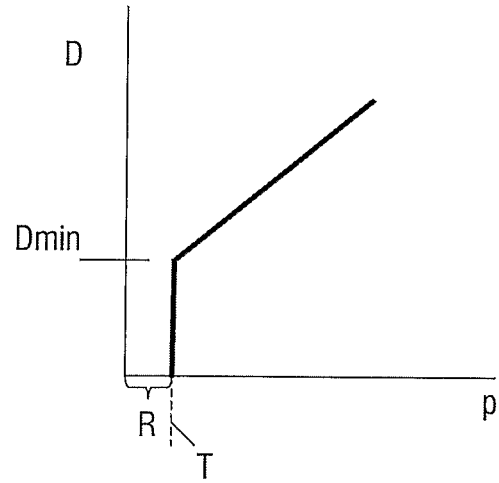

Preferably, the dimension of indication 202 has a minimum larger than the dimension of the contact area in order for indication 202 to be visible at even modest values of the pressure that can be taken as meaningful user input. FIG. 3 illustrates this by way of example with a graph of the dimension "D" of the indication as a function of the pressure "p". At zero pressure and within a functionally small range R of low pressure values, there is no indication being rendered at all. Then, as the value of the pressure is increased beyond a, preferably programmable, threshold T, the indication is rendered with a non-zero minimum dimension Dmin. Minimum dimension Dmin is chosen to be larger than the contact area between touch screen 106 and the user's finger 110, e.g., based on statistics based on biometric measurements and determined in advance. Alternatively, touch screen 06 registers both the position and the size of the contact area and adjusts the size of indication 202 so as to be sufficiently larger, possibly after user 110 has programmed system 100 according to his/her preferences regarding minimum dimension Dmin. If user 110 further increases the pressure, the dimension of the indication changes accordingly, linearly in the example shown. Relationships other than linear may be used as well, e.g., the rate of change of Dimension D per unit change in pressure p is larger for larger magnitudes of pressure p. Also, when pressure p reaches a specific high value that comes within range of the physical limits of what touch screen 106 can withstand, the indication may be made to cover the screen of display monitor 104 completely as a warning to the user.

As an alternative to the indication's attribute being its dimension, or in addition to that, visual indication may have a color that changes in dependence of the pressure, and/or a shape that changes in dependence of the color, etc.

The term "touch screen" as used in this text is also to include graphical tablets, e.g., stylus-operated. What has been discussed above with regard to touch screens that interact with the user's finger is also applicable to graphical tablets.

The invention claimed is:

1. A data processing system with a pressure-sensitive touch screen arranged over a display monitor, wherein the display monitor provides a graphical representation in response to a pressure registered by the touch screen, wherein the graphical representation includes an attribute that depends on a magnitude of the pressure registered by the touch screen, and wherein the graphical representation is rendered as centered around a first area on the display monitor below a second area on the touch screen at which the pressure is exerted, wherein the attribute does not change until the magnitude of the pressure exceeds a predetermined threshold pressure value, and wherein the attribute changes in proportion to the magnitude of the pressure when the magnitude exceeds the predetermined threshold pressure value.

2. The system of claim 1, wherein the first area has a first dimension that is under control of a second dimension of the second area.

3. The system of claim 1, wherein the attribute comprises at least one of: a size, a shape, a color, contrast with an image rendered on the display, and transparency.

4. The system of claim 1, wherein the attribute has a property that is programmable.

5. The system of claim 1 accommodated in a handheld electronic device.

6. The system of claim 1, wherein the predetermined threshold pressure value is user-programmable.

7. Control software stored in a memory and executed by a data processing system with a pressure-sensitive touch screen arranged over a display monitor, the software being operative to have the display monitor provide a graphical representation in response to a pressure registered by the touch screen, the graphical representation including an attribute that depends on a magnitude of a pressure registered by the touch screen and to have the graphical representation rendered as centered around a first area on the display monitor below a second area on the touch screen at which the pressure is exerted, wherein the attribute does not change until the magnitude of the pressure exceeds a predetermined threshold pressure value, and wherein the attribute changes in proportion to the magnitude of the pressure when the magnitude exceeds the predetermined threshold pressure value.

8. The software of claim 7, operative to control the rendering of the graphical representation that has an attribute depending on a magnitude of the pressure, wherein the attribute comprises at least one of a size, a shape, a color, contrast with an image rendered on the display monitor, and transparency.

9. The software of claim 7, wherein the predetermined threshold pressure value is user-programmable.

10. A pressure-sensitive touch screen arranged over a display monitor, wherein the display monitor is configured to provide a graphical representation in response to a pressure registered by the touch screen, the graphical representation including attribute that depends on a magnitude of a pressure registered by the touch screen, and wherein the graphical rerepresentation is rendered as centered around a first area on the display monitor below a second area on the touch screen at which the pressure is exerted, wherein the attribute does not change until the magnitude of the pressure exceeds a predetermined threshold pressure value, and wherein the attribute changes in proportion to the magnitude of the pressure when the magnitude exceeds the predetermined threshold pressure value.

11. The screen of claim 10, wherein the predetermined threshold pressure value is user-programmable.

12. A method of facilitating user interaction with a data processing system having a pressure-sensitive touch screen arranged over a display monitor, the method comprising providing on the display monitor a graphical representation in response to a pressure registered by the touch screen, the graphical representation with an attribute that depends on a magnitude of a pressure registered by the touch screen, wherein the graphical representation is rendered as centered around a first area on the display monitor below a second area on the touch screen at which the pressure is exerted, wherein the attribute does not change until the magnitude of the pressure exceeds a predetermined threshold pressure value, and wherein the attribute changes in proportion to the magnitude of the pressure when the magnitude exceeds the predetermined threshold pressure value.

13. The method of claim 12, comprising controlling a first dimension of the first area in dependence of a second dimension of the second area.

14. The method of claim 12, wherein the attribute comprises at least one of: a size, a shape, a color, contrast with an image rendered on the display, and transparency.

15. The method of claim 12, wherein the predetermined threshold pressure value is user-programmable.

* * * * *